United States Patent

[11] 3,607,924

[72] Inventors Jacques Boichard;
 Bernard Pierre Brossard; Michel Louis
 Marie Joseph Gay; Raymond Marc
 Clement Janin, all of Lyon, France
[21] Appl. No. 579,521
[22] Filed Sept. 15, 1966
[45] Patented Sept. 21, 1971
[73] Assignee Rhone-Poulenc S. A.
[32] Priority Sept. 22, 1965, May 11, 1966
[33] France
[31] 32310 and 61181

[54] PROCESS FOR THE PREPARATION OF GLYOXYLIC ACID
 8 Claims, No Drawings
[52] U.S. Cl. ..................................................... 260/533 R
[51] Int. Cl. ......................................................... C07c 59/30
[50] Field of Search ........................................... 260/533

[56] References Cited
 UNITED STATES PATENTS
 2,847,465 8/1958 Robertson et al. ............. 260/533
 2,791,598 5/1957 Brown et al. .................... 260/533
 OTHER REFERENCES
 Platz et al., Chem. Abstr., 60;14390c (1964).

Primary Examiner—James A. Patten

ABSTRACT: Glyoxylic acid is produced in good yield by oxidizing ethylene with 10 to 14.5 percent aqueous nitric acid.

3,607,924

PROCESS FOR THE PREPARATION OF GLYOXYLIC ACID

This invention relates to a process for the preparation of glyoxylic acid.

Glyoxylic acid is an important intermediate in synthetic organic chemistry and particularly in the preparation of pharmaceuticals. Many processes are known for the preparation of glyoxylic acid, but, unfortunately, they have only academic interest and are not suitable for large-scale industrial production.

Two processes give good yields and have been mainly used on an industrial scale. They are: (1) the reaction of sodium dichloroacetate with a salt of an organic acid, for instance sodium acetate or benzoate, as described in French Pat. No. 772,860 and (2) the oxidation of an aqueous solution of glyoxal with nitric acid, according to the procedure described in German Pat. No. 932,369 and in French Pat. No. 1,326,605. These two processes are suitable for large-scale operation, but present the drawback that it is necessary to start from materials, such as dichloroacetic acid or glyoxal, which must be prepared from acetic acid or acetaldehyde respectively. Thus the synthetic or glyoxylic acid according to the two abovementioned processes, manifestly requires more than one-step reaction. It is apparent that from an industrial point of view, it would be very advantageous to use a process for the preparation of glyoxylic acid directly from an easily available raw material, for instance ethylene, in one step, that is, without going through the intermediates acetaldehyde and glyoxal, or acetic acid.

The object of this invention is to provide a process for the preparation of glyoxylic acid from ethylene in one step which is suitable for large-scale operation. Another object Another object is to provide a process which may be conducted continuously.

Some experimental work has been reported on the oxidation of ethylene with nitric acid. French Pat. No. 1,363,089, describes the oxidation of ethylene with nitric acid, of concentration between 1 and 40 percent, preferably between 2 and 20 percent, in the presence of a palladium salt. The product is glyoxal. More specifically, according to this process, ethylene is bubbled through an aqueous solution of nitric acid, containing also the palladium salt, up to such a time that the concentration of nitric acid falls below the value of 1 percent by weight.

It has now been found, and this constitutes the gist of the present invention, that a good yield of glyoxylic acid is obtained, by the oxidation of ethylene with nitric acid in the presence of a palladium salt, if the concentration of nitric acid in the reaction medium is maintained in the range between 10 and 16 percent and preferably between 12.5 and 14.5 percent.

In the actual practice of this invention, the reaction temperature may vary according to the concentration of nitric acid in the reaction medium. In general, the temperature is kept between 10° and 80° C. and preferably between 30° and 60° C. The valence of palladium and the nature of the anion in the palladium salts have no effect upon the course of the reaction. Thus, it is possible to utilize salts such as palladous chloride, sulfate, nitrate, phosphate or oxalate, or substances such as metallic palladium or palladium oxide hydrate, which give palladous nitrate under the experimental conditions. The amount of the palladium salt present in the reaction medium must be such that the amount of metallic palladium present is greater than 0.0001 percent weight. The palladium or palladium compound act as a catalyst for the oxidation.

As already mentioned above, the concentration of nitric acid in the reaction medium is maintained in the range between 10 and 16 percent. This may be accomplished either by introduction of fresh nitric acid into the reaction vessel, or by simultaneous introduction of fresh nitric acid and recycling of the nitric acid which is obtained by oxidation and treatment with water of the nitrous gases, resulting from the reduction of nitric acid in the course of the reaction with ethylene.

Although the reaction takes place in the absence of nitrogen peroxide, it is preferably to operate in the presence of a small quantity of nitrogen peroxide, between 1 and 5 percent by weight of the nitric acid solution, which acts as initiator for the reaction and facilitates the oxidation.

Any source of ethylene may be used for the reaction, and impurities consisting of saturated hydrocarbons, for instance ethane, do not interfere. It is possible to operate at normal atmospheric pressure or at pressure higher than atmospheric. Thus, the permissible range is very wide, up to 100 bar. Obviously, the rate of absorption of ethylene in the reaction mixture, increases with increase in pressure.

In the actual practice of the invention, nitric acid or predetermined suitable concentration, the catalyst, and if nitrogen peroxide is used, also nitrogen peroxide, are placed in a reaction vessel, and the temperature is raised to the selected temperature. Then ethylene, in a fine stream, is bubbled through the nitric acid solution, at a rate which depends, for a predetermined concentration of nitric acid, on the temperature, since the temperature controls the reaction rate. Simultaneously, it is necessary to continue to add nitric acid to the reaction vessel in order to maintain the concentration within the proper limits.

After the desired amount of ethylene has been passed through, the reaction mixture is let stand, in order to complete the oxidation of the ethylene which has been absorbed. In general, the temperature is maintained the same, as in the previous step. The duration of the reaction depends on the temperature.

The reaction in accordance with this invention, is economically conducted. The ethylene not used during the course of the oxidation, may be recycled. The catalyst may be recovered from the mother liquid according to known methods, and may be utilized in other operations. Another advantage of the oxidation in accordance with this invention, is that the reactants and the reaction conditions are very suitable for continuous operation.

The following examples are described in detail for the purpose of better illustration of the invention.

EXAMPLE 1

The reactor is a cylindrical glass vessel, of 300 mm. height, 60 mm. diameter and 1,000 cm.³ utilizable volume. The bottom of the vessel is made of fritted glass No. 2, that is of porosity between 40 and 90$\mu$. The reactor is provided with a gas inlet, through the porous bottom, and at the top, with ground glass adapters for a thermometer, a dropping funnel, and an outlet tube for the gas which is connected with a recovery vessel, and for the quantitative analysis of the gas. A straight condenser and another coiled condenser, arranged in series and cooled with ice water, are inserted between the condenser and the outlet tube.

An aqueous solution of 110 g. of nitric acid and 10 g. $NO_2$, a total of 821.5 g., is placed in the reactor. One gram of metallic palladium, in the form of palladous chloride, $PdCl_2$, is added. The concentration of nitric acid in the reaction mixture is 13.4 percent. After the temperature has reached 40° C., a stream of ethylene is bubbled through the vessel at a rate of 1.91 liters per hour, measured at room temperature and pressure. The concentration of nitric acid in the solution is maintained in the range of the same initial concentration, by periodic addition of 95 percent nitric acid by means of a dropping funnel. The unused ethylene in the gaseous material which escapes from the vessel is quantitatively determined by means of the Orsat apparatus. The procedure consists of first, elimination of nitrous vapors by oxidation and treatment with water, then elimination of carbon dioxide by bubbling in potassium hydroxide solution, and reaction of ethylene with the sulfovanidic acid reagent.

Ethylene is passed through the reaction mixture for a period of 26 hours and 15 minutes, after which a total of 50.4 liters (2.25 moles) of ethylene have been introduced. The ethylene recovered in the effluent gas is 33.8 liters, corresponding to a conversion of 32.9 percent. The quantity of 95 percent nitric acid added in order to keep the concentration of nitric acid at the desired level is 77 g. After all the ethylene has been introduced, the nitric acid concentration is 12.4 percent.

The reaction mixture is let stand at 40° C. for a period of 20 hours in order to complete the oxidation of the ethylene absorbed in the medium. The concentration of nitric acid does not substantially vary during this stage. The weight of the reaction mixture at the end of the reaction, is 900.3 g.

The mixture so obtained, is cooled to 20° C. and the yield of glyoxylic acid is determined by analysis of a sample. The analysis is conducted by neutralizing and making the sample alkaline with sodium hydroxide, oxidizing the glyoxylic acid to oxalic acid, with an excess of iodine, which then is back-titrated according to conventional methods.

The yield of glyoxylic acid is 24 g. (0.324 moles), that is, 43.8 percent, based on the ethylene which is not recovered. Oxalic acid in small quantities is also formed.

EXAMPLE 2

A rocking autoclave of 1,000 cm.$^3$ capacity, provided with an opening for the introduction of the reactants, is charged with 392.6 g. of an aqueous solution of nitric acid, of 16 percent concentration, and 6 g. of an aqueous solution of palladous chloride, containing 10 percent by weight of the metal.

The autoclave is closed ad ethylene under a pressure of 20 bar is added, which corresponds to 16.3 g. (0.558 moles.). Rocking of the autoclave is started, while the temperature is brought to 40°–45° C. The pressure rises to about 21 bar, which is maintained constant. The concentration of nitric acid is also maintained constant by periodic addition of ethylene and nitric acid. After 2 hours, the total 95 percent nitric acid added is 117.7 g. and the total amount of ethylene added is 29.6 g.

The autoclave is cooled, the content is freed of the gaseous material present, and the unreacted ethylene is determined in the same manner as in example 1. The total reacted ethylene is 0.975 mole.

The liquid product amounts to 485 g. and the nitric acid content is 13.8 percent. The liquid product is warmed to 40° C. at atmospheric pressure for a period of 25 hours. By titration, the concentration of nitric acid, in the liquid reaction mixture is found to be 11.5 percent. The glyoxylic acid is formed in yield of 39 percent, based on the reacted ethylene. In addition to glyoxylic acid, oxalic acid, in small quantities, is formed. No glyoxal is detected. In view of the results reported in French Pat. No. 1,363,089, that is, that ethylene by oxidation with nitric acid produces glyoxal, the production of glyoxylic acid, under the conditions as described herein, with no trace of glyoxal, is surprising. Although only two examples have been described in detail, it will be apparent to those skilled in the art that many variations and modifications are possible, without departing from the spirit of the invention, which is to be limited only by the scope of the appended claims.

What is claimed is:

1. A process for the preparation of glyoxylic acid from ethylene wherein ethylene is passed through an aqueous solution of nitric acid at a temperature between 10° and 80° C. in the presence of a palladium salt as catalyst, ethylene which is not absorbed by the nitric acid solution is removed, and the reaction mixture is allowed to stand at a temperature of 10°–80° C. for a time sufficient to complete the oxidation of the absorbed ethylene to glyoxylic acid, the concentration of nitric acid in the reaction mixture being maintained within the range between 10 and 16 percent throughout the reaction.

2. The process according to claim 1 wherein the concentration of nitric acid is between 12.5 and 14.5 percent.

3. The process according to claim 1 wherein the concentration of the palladium salt is such that the quantity of metallic palladium is at least 0.0001 percent by weight.

4. The process according to claim 1 wherein nitrogen peroxide in amount between 1 and 5 percent weight of the nitric acid solution, is added to initiate the reaction.

5. The process according to claim 1 wherein the pressure is between atmospheric pressure and 100 bar.

6. The process according to claim 1 wherein 95 percent nitric acid is added during the course of the oxidation, to maintain the concentration of nitric acid at between 10 and 16 percent.

7. The process according to claim 1 wherein the temperature is maintained between 30° and 60° C.

8. The process according to claim 1 wherein the said palladium salt is a member selected from the group consisting of palladous chloride, sulfate, nitrate, phosphate, or oxalate.